United States Patent
Albert et al.

(10) Patent No.: US 10,126,416 B2
(45) Date of Patent: Nov. 13, 2018

(54) LIGHT GRID

(71) Applicant: SICK AG, Waldkirch (DE)

(72) Inventors: Magnus Albert, Waldkirch (DE); Jörg Sigmund, Waldkirch (DE)

(73) Assignee: SICK AG, Waldkirch (DE)

( * ) Notice: Subject to any disclaimer, the term of this patent is extended or adjusted under 35 U.S.C. 154(b) by 221 days.

(21) Appl. No.: 15/141,940

(22) Filed: Apr. 29, 2016

(65) Prior Publication Data
US 2016/0327639 A1    Nov. 10, 2016

(30) Foreign Application Priority Data

May 5, 2015 (EP) .................................. 15166417

(51) Int. Cl.
| | | |
|---|---|---|
| *G01S 7/497* | (2006.01) | |
| *F16P 3/14* | (2006.01) | |
| *G01S 7/486* | (2006.01) | |
| *G01S 17/10* | (2006.01) | |

(52) U.S. Cl.
CPC ............ *G01S 7/4972* (2013.01); *F16P 3/144* (2013.01); *G01S 7/4861* (2013.01); *G01S 17/10* (2013.01)

(58) Field of Classification Search
CPC ........ G01S 7/4802; G01S 13/78; G01S 13/86; G01S 17/023; G01S 17/42; G01S 17/58; G01S 17/66; G01S 17/74; G01S 17/89; G01S 7/4811
See application file for complete search history.

(56) References Cited

U.S. PATENT DOCUMENTS

| | | | | |
|---|---|---|---|---|
| 2003/0043058 A1* | 3/2003 | Jamieson | ............. | G01C 23/005 340/961 |
| 2004/0233414 A1* | 11/2004 | Jamieson | ............. | G01S 7/4802 356/4.01 |
| 2014/0071433 A1* | 3/2014 | Eisele | ................... | G01S 7/4816 356/5.01 |
| 2014/0327902 A1* | 11/2014 | Giger | ..................... | G01S 17/08 356/5.01 |
| 2016/0041266 A1* | 2/2016 | Smits | ..................... | G01S 17/66 356/5.01 |

FOREIGN PATENT DOCUMENTS

| | | |
|---|---|---|
| DE | 43 40 756 A1 | 11/1993 |
| DE | 20 2007 014 917 U1 | 4/2008 |
| EP | 1 329 739 A2 | 7/2003 |
| EP | 1 879 044 A1 | 1/2008 |

OTHER PUBLICATIONS

Search report issued in European application No. 15166417.4 dated Dec. 7, 2015.

* cited by examiner

*Primary Examiner* — Luke D Ratcliffe
(74) *Attorney, Agent, or Firm* — Nath, Goldberg & Meyer; Jerald L. Meyer (57) ABSTRACT

A light grid in accordance with the time of flight principle having at least one light transmitter (2) which transmits light signals (3) into a measured zone (5) and having at least one light receiver (4) which receives the light signals (3) reflected from the measured zone (5) and supplies them in the form of received electrical signals to a control and evaluation unit (7) which determines a distance signal representative of the distance (8) of objects (6) from the light grid (1) from the time between the transmission and the reception of the light signal (3) while taking account of the speed of light, with the light receiver (4) having at least one single photon avalanche diode (9).

16 Claims, 9 Drawing Sheets

LIGHT GRID

The present invention relates to a light grid in accordance with the preamble of the independent claim.

Optical safety sensors have to include a series of self-test possibilities of their measurement chain to demonstrate their functional capability and in order to achieve a specific safety category or a specific safety level in accordance with a safety standard.

The testing has to be of different depths depending on the desired category. For example, according to DIN EN 61496, a loss of detectability in the response time and a restriction of the detection capability must be recognized in four seconds.

Today's safety light grids are configured with transmitters and receivers in separate housings. The interruption of the light path between the transmitter and the receiver serves as the detection principle.

Today's safe laser grids and light barriers with oppositely disposed transmitters and receivers are set up according to the closed-circuit principle. In this process, the light signal is transmitted on a direct path from the transmitter to the receiver and in so doing runs through a complete measurement chain. An interruption of this direct light path is detected. Changes of the received signal, e.g. by front screen contamination, transmitter degradation, etc. are in this respect expressed directly in the amplitude level of the received signal and can be directly detected.

Since the technical safety decision is made on the basis of the amplitude threshold, every critical deterioration in the measurement path can be recognized and a warning signal or stop signal can be output accordingly.

The kind of self-testing according to the closed-circuit principle used in the light grid in accordance with the prior art cannot be used with freely scanning light grids/light sensors since the direct counter-side is missing.

With freely scanning systems, the amplitude of the received signal in the measurement channel is above all dependent on the distance and the remission of the target or is completely lacking when the sensor looks into "infinity".

In the light grid systems in accordance with the prior art, active components, namely transmitters and receivers, have to be attached at both sides of the protected field. This means a high cabling effort, space requirements and restrictions in use.

It is an object of the invention to provide a scanning light grid or safety light grid which has comprehensive possibilities for a self-test to obtain a high safety category. In addition, an attractively priced implementation should be made possible through a high integration.

The object is satisfied in accordance with claim 1 by a light grid in accordance with the time of flight principle having a light transmitter which transmits light signals into a measured zone and having at least one light receiver which receives the light signals reflected from the measured zone and supplies them in the form of received electrical signals to a control and evaluation unit which determines a distance signal representative of the distance of objects from the light grid from the time between the transmission and the reception of the light signal or signals while taking account of the speed of light, with the light receiver having at least one single photon avalanche diode.

Single photon avalanche diodes are also simply called SPADs. Other common terms are 'silicon photomultiplier' (SiPM), 'Geiger mode avalanche photon diode' or 'single photon counting diode'. Single photon avalanche diodes are photosensitive detectors which can be implemented in standard CMOS technology and which, in a similar manner to avalanche photo diodes, convert incident photons into current pulses. Unlike avalanche photo diodes, however, single photon avalanche diodes are operated over an avalanche voltage. A single incident photon thus already triggers an avalanche effect which can be detected as a current pulse. Amplification factors of $10^5$ to $10^6$ allow a high sensitivity and thus the detection of even single photons.

Different time of flight methods with a corresponding evaluation can be implemented for the distance measurement.

A pulse method can be provided. For example, one or more time-to-digital converters can be provided for the pulse method in that each single photon event is provided with a time stamp. With a wanted signal, a plurality of time signals therefore occur in correlation. The measured value generation takes place statistically. Background light, in contrast, generates randomly distributed time stamps.

It is in this respect a light grid in accordance with the time of flight principle having at least one light transmitter which transmits consecutive light pulses into a measured zone and having at least one light receiver which receives the light pulses reflected from the measured zone and supplies them in the form of received electrical signals to a control and evaluation unit which determines a distance signal representative of the distance of objects from the light grid from the time between the transmission and the reception of the light pulse while taking account of the speed of light, with the light receiver having at least one single photon avalanche diode.

Known phase measurement methods can furthermore also be used in which a modulated light signal is used. In these methods, for example, the single photon events are distributed via a gating signal into two counters and a phase is calculated from the ratio of the counts.

Furthermore, analog signals of the single photon diode can be evaluated. They are compared with a threshold value, are sampled or are evaluated using statistical methods.

In the evaluation according to the time of flight process, an amplitude value can also be generated in addition to the distance value, e.g. by a histogram of the time stamps, by the count rate or by the voltage amplitude in an analog evaluation. A plausibility check can be carried out by the amplitude value, in particular in technical safety applications.

The light grid in accordance with the invention has the advantage that it is of a compact design and can be accommodated in a small housing.

The use of single photon avalanche diodes offers the following advantages: Single photon avalanche diodes can be manufactured in a standard CMOS process. The light grid thus has high integration capability, e.g. while using ASIC modules. The light transmitter, for example a VSCEL, a laser diode or a light emitting diode, and the control and evaluation unit or a separate light transmitter control can likewise be integrated on the chip.

The light grid is less expensive than lights grids previously typical in safety engineering using photosensitive receivers. Very compact systems are possible by a multiple arrangement of light scanners comprising at least one light transmitter and at least one light receiver. A high sensitivity down to single photons is given by the use of single photon avalanche diodes. An optional optics can thereby be designed in a very compact manner.

In accordance with the invention, a temperature compensation of the time of flight evaluation or a temperature regulation of the single photon avalanche diode bias is possible in the light grid. The bias of the single photon avalanche diodes will preferably be regulated in a temperature dependent manner to maintain it in the working range of the Geiger mode. The logic for the regulation is preferably co-integrated. Furthermore, only voltages of less than 50V and no high voltages are required for the operation of the single photon avalanche diode receiver in the light grid. Furthermore, a plausibility check is possible by an evaluation of the distance and of the signal level.

The light transmitter is in this respect optionally arranged in a first housing chamber and the light receiver in a second, adjacent housing chamber. The housing chambers are optically isolated so that there is no direct optical connection between the light transmitter and the light receiver. Only light of the light transmitter reflected or remitted at an object arrives at the light receiver.

The light grid has a housing and a plurality of light scanners are connected to one another via connection lines.

In a further development of the invention, a reference surface is provided, wherein the light signals or light pulses of the light transmitter are incident onto the reference surface and the reflected light signals or light pulses are incident onto the light receiver. However, an already present contour can optionally also serve as a reference surface.

The light grid only has to be arranged and cabled at one side of the measured zone or protected field. Each measurement channel or light scanner comprising a light transmitter and a light receiver measures the distance from a possible object as well as, optionally, the signal amplitude scattered back from it via the time of flight.

The protected field dimensions or measured zone dimensions can be defined in two manners.

First, the distances and signal amplitudes with respect to a natural reference surface can be taught. In this process, the light grid measures every deviation with respect to these taught values, namely distances which are too large or too small, or signal amplitudes which are too large or too small produce a protected field infringement and an object determination signal.

A safety-relevant testing of the light grid is simpler than in the prior art since work is carried out with two different expected values with the measured value. Every deviation due to an incorrect measurement or to an environmental influence of the light grid, for example aging of the light transmitter, the influence of external light and/or contamination results in a different measured value on the monitoring of either the amplitude or the distance.

Second, the distances for each measurement channel can be configured using corresponding software. In this respect, the light grid measures in a manner scanning freely in the space and every falling below of the configured distance value results in a protected field infringement. In this respect, variable protected field geometries can be implemented which can also be varied by protected field switchover, for example muting or blanking, e.g. in a cycle operation. The safety-relevant sensor testing is more difficult in this case since it is not possible to start from expected values.

In a further development of the invention, a retroreflector surface is provided, wherein the light signals or light pulses of the light transmitter are incident onto the retroreflector surface and the reflected light signals or light pulses are incident onto the light receiver.

At least one light scanner, comprising a light receiver and a light receiver, is arranged at a side of the monitored zone in this respect. The retroreflector is arranged at the oppositely disposed side. The retroreflector is a triple reflector, for example. The retroreflector, for example, has a dimension of approximately 80 mm×80 mm. Other geometries and dimensions are also conceivable, however.

With suitable opening angles of the light transmitter and of the light receiver of the light scanner, the simultaneous monitoring of a plurality of retroreflectors by one light scanner is also possible in this respect.

Since the backscattered light signal of a retroreflector is as a rule considerably higher than the light remitted by the other environment, light transmitters and/or light receivers can be operated without an additional collimation optics. The opening angles of the light transmitter and light receiver can in particular be restricted by additional optics for larger ranges for improving the measuring behavior with external light.

The distance from the retroreflector and the signal level measured at the light receiver are taught during the putting into operation, for example.

It is possible by brief interruptions of the measurement cycle also to determine a level by external light irradiation by means of the light receiver. In this respect, fluctuations over larger time scales, for example due to temperature changes or due to changes of the environmental light can be continuously logged and the desired values can be correspondingly compared in the measurement of the signal level.

A retroreflector is, for example, associated in an oppositely disposed manner with each light scanner in the light grid. The retroreflector can in this respect also be arranged as movable, for example at a sliding gate. The detection of objects is furthermore possible as long as the movement of the retroreflector is substantially slower than typical object movements which are to be detected.

Furthermore, deflection mirrors can also be arranged between the light scanner or light grid and the retroreflector to implement monitored zones over one or more corners.

Phasing methods can also be used beyond the unambiguousness region by the monitoring of both the distance value and the signal level as long as an energetic detection of the retroreflector is possible.

In a further development of the invention, a first light receiver forms a first light scanner with a first light transmitter and the first light receiver forms a second light scanner with a second light transmitter, with the first light transmitter and the second light transmitter being able to be activated after one another.

With light grids in accordance with the prior art, the geometrical resolution is predefined by the beam spacing. With the scanning light grid in accordance with the invention, the distance of the collimated light transmitters is used for defining the geometrical resolution.

To save costs, with the scanning light grid, a single light transmitter can be used serially in time for the evaluation of two or more light transmitters adjacent to it. Some of the light receivers can be saved by this. The reception lobe of the light receiver in this respect covers both light transmitters.

In a further embodiment, a first light receiver forms a first light scanner with a first light transmitters and a second light receiver forms a second light scanner with the first light transmitter.

This provides a further possibility for a higher security of detection in the light grid by a parallel evaluation of two adjacent light receivers which receive light pulses from a single light transmitter. A redundancy in the total light grid can hereby be achieved.

In a further embodiment, a plurality of non-adjacent light transmitters can be activated simultaneously.

To achieve a low response time, a plurality of light scanners can be operated in parallel, preferably in an arrangement without overlapping of transmission lobes or reception lobes. For example, spaced apart light scanners having a distance of e.g. 5 to 10 light scanners can be activated simultaneously. A directly adjacent light scanner is acted thereafter in a time multiplex operation. Every distance measuring unit is therefore measured one after the other within spatial groups in a time multiplex. it is hereby achieved that the response time remains low as the length of a light grid increases.

In a further development of the invention, different light transmitters have different pulse repetition frequencies, modulation frequencies or different phases.

Adjacent light scanners can thereby be activated simultaneously in parallel without crosstalk being able to occur between the channels.

In a further development of the invention, the light receiver has at least one array comprising single photon avalanche diodes.

So that the light receiver with the at least one single photon avalanche diode is not already saturated by single photons, e.g. by external light, a number of single photon avalanche diodes are arranged and are evaluated together. In principle, the analog signals of the single photon avalanche diode pixels or of the single photon avalanche diode elements are added. It is also possible to digitize the avalanches of each single photon avalanche diode, for example, via a comparator or e.g. an analog-to-digital converter, and to evaluate them digitally. The avalanche signals can, however, also be further processed directly digitally if the signal is already sufficiently high.

To cover the option of a larger angular range by the light grid and nevertheless to obtain the required spatial resolution for the detection of e.g. a leg, the single photon avalanche diode array can be broken down into so-called macropixels. In this respect, a plurality of spatially adjacent single photon avalanche diode cells are associated with a common evaluation and evaluate the received light from a specific angular range via a corresponding optics. The arrangement can in this respect take place in a linear or areal manner.

The dynamics and/or the external light behavior can be scaled via the different single photon avalanche diodes or the single photon avalanche diode arrays.

The signal level can be determined with single photon avalanche diodes either directly over the count rates of the photons if the signals are digitized directly on a pixel level or over the measurement of the amplitude of the sum current of all pixels. In the monitored state, both values are measured continuously and are compared with the taught desired value. If deviations occur in one of the two values, this deviation is checked for plausibility via the second measured value and is detected as an intrusion where applicable.

In an embodiment of the invention, a transmission optics, in particular a lens, is arranged in front of the light transmitter. The transmission optics is optionally integrated on a chip or in the chip housing to achieve an inexpensive and compact solution, in particular with high volumes.

The light grid is very compact due to a high integration and a small size of the transmission optics.

Different monitoring angles and different ranges can be realized by different transmission optics.

In a further embodiment, a reception optics, in particular a lens, is arranged In front of the light receiver.

The reception optics is optionally integrated on a chip or in the chip housing to achieve an inexpensive and compact solution, in particular with high volumes.

An optical band pass filter can also be arranged, in particular vapor deposited, directly on the chip or on the light receiver to attenuate background light.

The light grid is very compact due to a high integration and a small size of the transmission optics.

Different monitoring angles and different ranges can be realized by different reception optics.

In a further development of the invention, a further light receiver as a reference light receiver is provided as a second reception channel for a safety-related self-testing.

The reference light receiver is arranged in the same housing chamber as the light transmitter and is separated from the light receiver by a channel separation. The reference light receiver can in this respect be identical to the light receiver. The reference light receiver can in particular be a single photon avalanche diode array.

The reference light receiver allows the following self-tests.

First, the power, in particular the laser power, of the light transmitter can be monitored in every measurement cycle via scattered light within the housing chamber of the light scanner in the reference light receiver. Large deviations or a failure of the light transmitter can thus be recognized.

Second, the exact time behavior or timing of the light transmitter can be monitored and offsets which may occur can be corrected, e.g. on temperature influences.

Third, a contaminated front screen of the light grid can be detected via a change of the front screen echo by backscatter at the dirt particles on the front screen.

Fourth, manipulation attempts can likewise be recognized via the backscatter to the reference light receiver, even if the light receiver does not obtain any signal.

Fifth, in the phases in which no light is transmitted, the external light level can be measured at the reference light receiver. The corresponding measured signal can be compared with the signal of the light receiver, whereby the sensitivity of the light receiver can be verified and can be used with an optionally different scaling for checking the required signal-to-noise ratio in the actual measurement channel.

Additional measured values which are generated on the light receiver and on the reference light receiver allow a technical safety evaluation of the operational reliability.

A direct measurement of the external light level on the light receiver and optionally on the reference light receiver allows a good determination of the signal-to-noise ratio and a safety-relevant sensitivity of the system.

In a further development of the invention, a further light transmitter is provided as the reference light transmitter for the safety-relevant self-test.

Furthermore, a reference light transmitter can also be provided as a second light transmitter.

The reference light transmitter can be integrated in the housing chamber of the light receiver for testing the light receiver. A test of the reception channel to the time behavior or timing as well as effects dependent on the signal level can hereby be carried out. The reference light transmitter is here preferably attached close to the light receiver and can, for example, likewise be integrated in the CMOS.

Due to the spatial proximity, the additional reference light transmitter can be realized with a lower power and thus less expensive light transmitter. The transmission power of the reference light transmitter is set such that the signal level corresponds to the actual received signals of the light receiver. The same applies to the time progression of the transmitted signal of the reference light transmitter.

Optical test pulses having different time progressions and amplitudes can be used for testing the light receiver and a time of flight can be imitated via a controllable delay relative to the start time of the measurement.

Overload measurements can in particular be easily carried out in this manner. The time behavior, that is the timing, of the distance measurement chain can be tested via a programmable variable delay before the light transmitter.

The dynamics of the light receiver can be tested via an adjustable signal level of the light transmitter. The reference light transmitter can be set up with a lower power transmission diode and thus less inexpensive transmission diode since, due to the spatial proximity, a smaller transmission power is sufficient to generate comparable signals on the receiver.

The reference light transmitter thus allows the following tests:

First, a linearity and an integrity of the received signals of the light receiver can be ensured for different delays or times of flight. The distance measurement can thus be checked indirectly.

Second, the dynamics and the sensitivity of the light receiver can be checked by measuring the signal level using different reference amplitudes of the reference transmitter. The measurements can also be used for compensating aging effects or degradation or for compensating temperature effects.

Third, e.g. overload measurements can be carried out as required.

In a further development of the invention, the control and evaluation unit is configured with two channels.

Due to the two-channel control and evaluation unit, the light grid can be used as an independent safety sensor or safety light grid even with higher demands on the safety level to be achieved.

The light grid is thereby itself able to carry out a plurality of self-tests and to ensure is own functionality in a comprehensive manner.

Furthermore, however, a plurality of light scanners can also communicate over a common bus and a central safety controller is used to configure the individual light scanners, to poll their states and, optionally, to feed in suitable test signals, to evaluate and compare the received signals, to signal warnings and, in case of danger, to stop a machine to be secured or to stop a self-driving vehicle to be secured.

It may be sufficient, for example, if every single light scanner on the common bus only reports when its measured values infringe or exceed previously taught thresholds or when a problem has been diagnosed in a self-diagnosis.

In a further development of the invention, a positional sensor is provided for evaluating the sensor position of the light grid. A safety-relevant alignment of the light grid is in particular provided.

If the light grid is positioned by the user and if it monitors the desired zone, it may be necessary to monitor this position of the monitored zone in order e.g. to recognize a maladjustment of the sensor due to mechanical effects. An MEMS positional sensor is used as the positional sensor, for example. MEMS stands for microelectromechanical system.

These positional sensors are today available at favorable prices and are highly integrated due to high volumes in the consumer and automotive fields. Once the position has been taught once, the positional sensor recognizes every change and a safety controller connected downstream or a safety control connected downstream evaluates the position signals if a safety problem is produced by a maladjustment.

In addition, the positional sensor can serve as an alignment aid or as an electronic spirit level, which is in particular helpful on the adjustment of a sensor system or light grid.

In a further development of the invention, the light scanner is an integrated light scanner module.

It is possible by the use of a CMOS process to integrate additional components such as the control and evaluation unit, the laser driver, the voltage supply and/or a temperature regulation logic on a chip together with the photosensitive receiver. All the components of the measurement chain of the light scanner can be integrated in a single ASIC using this technology. The ASIC is able to measure distance values independently and to forward the final result to the central control via a suitable bus.

The light transmitter, for example a laser, a VCSEL or a light emitting diode can also be co-integrated on the integrated light scanner module, the chip, by means of a hybrid technology. The reference light receiver and/or the reference light transmitter can also be provided in the integrated light scanner module.

The possibility of a background light measurement in the single photon avalanche diode array is interesting for a safety sensor. The external light is a dominating noise source via the shot noise in a single photon avalanche diode. The thermal noise is much smaller with respect to classical photodiode receivers since the transimpedance transducer which is customary in the classical reception path and which represents a main source for the thermal noise is not required.

The external light source can be determined via the number of incident external light photons on the light receiver on the single photon avalanche diode array in the transmission breaks of the measurement system. E.g. in the case of the listed phase measurement method through a further gating signal which adds the single photon events in a counter in the corresponding transmission breaks.

For a secure detection of objects in a safe light grid, a required signal-to-noise ratio can be previously defined at which an object has to be recognized under all circumstances. It can be monitored by the determination of the external light source during the measurement cycle whether the noise level becomes too large in comparison with an expected signal from the intruding object and whether safety-relevant shut down correspondingly has to take place.

A modular design serves as the basis for the light grid. The light grid, for example, has the components: Optics module with transmission optics and reception optics, measuring core with light transmitter and light receiver and/or back-end with control and evaluation unit, I/O drivers, bus interface and/or safety control.

The measuring core preferably comprises a high-integration CMOS-ASIC. A design of discrete components is, however, likewise possible.

Due to the good alignment characteristics of light, different variants of the light grid can be realized with different opening angles and ranges through corresponding optics modules and are adapted to different demands of different applications.

In accordance with the invention, light transmitters and light receivers can be operated without transmission optics and reception optics, whereby a greater opening angle and a small range is achieved. However, the light beams can also be collimated or further expanded by optical elements.

The light receiver can be provided with a filter element, for example with a band pass filter, for restricting the external light incidence.

The invention will also be explained in the following with respect to further advantages and features with reference to the enclosed drawing and to embodiments. The Figures of the drawing show in.

In the following Figures, identical parts are provided with identical reference numerals.

Figure 7:
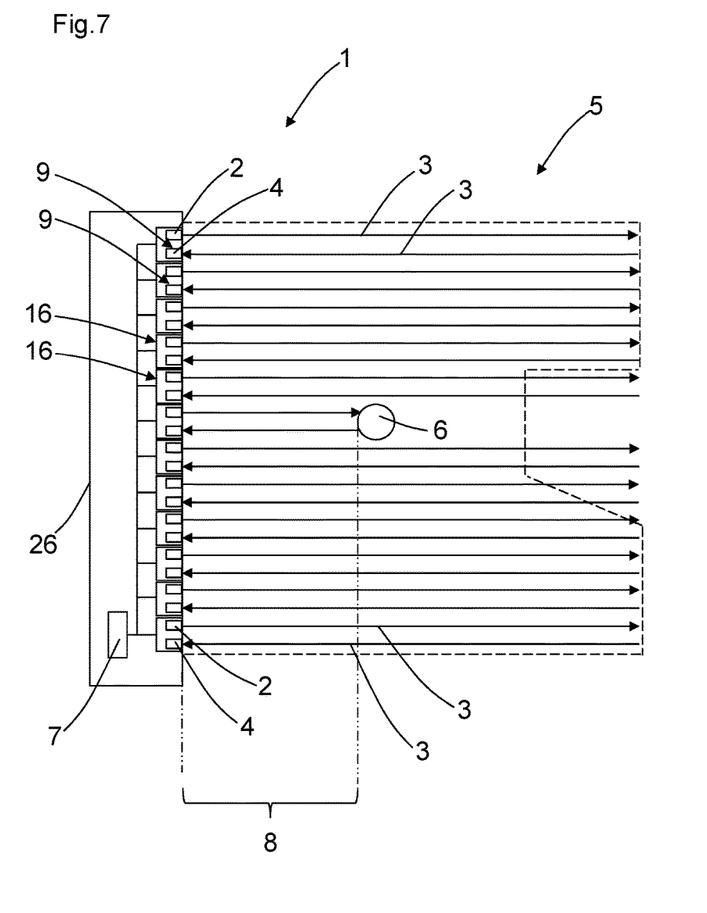
FIGS. 7 to 9 a light grid.

FIG. 7 shows a light grid 1 in accordance with the time of flight principle having at least one light transmitter 2 which transmits light signals or consecutive light pulses 3 into a measured zone 5 and having at least one light receiver 4 which receives the light signals or light pulses 3 reflected from the measured zone and supplies them in the form of received electrical signals to a control and evaluation unit 7 which determines a distance signal representative of the distance 8 of objects 6 from the light grid 1 from the time between the transmission and the reception of the light signals or light pulses 3 while taking account of the speed of light, wherein the light receiver 4 has at least one single photon avalanche diode 9.

The light grid 1 has a housing 26 and a plurality of light scanners 16 are connected to one another via connection lines.

Different time of flight methods with a corresponding evaluation can be implemented for the distance measurement.

A pulse method can be provided. Furthermore, a CW (continuous wave) process can be used, with a light signal being used which is constant in time.

Furthermore, analog signals of the single photon avalanche diode 9 can also be evaluated. They are compared with a threshold value, are sampled or are evaluated using statistical methods.

In the evaluation according to the time of flight process, an amplitude value can be generated in addition to the distance value, e.g. by a histogram of the time stamps, by the count rate or by the voltage amplitude in an analog evaluation.

Figure 1:
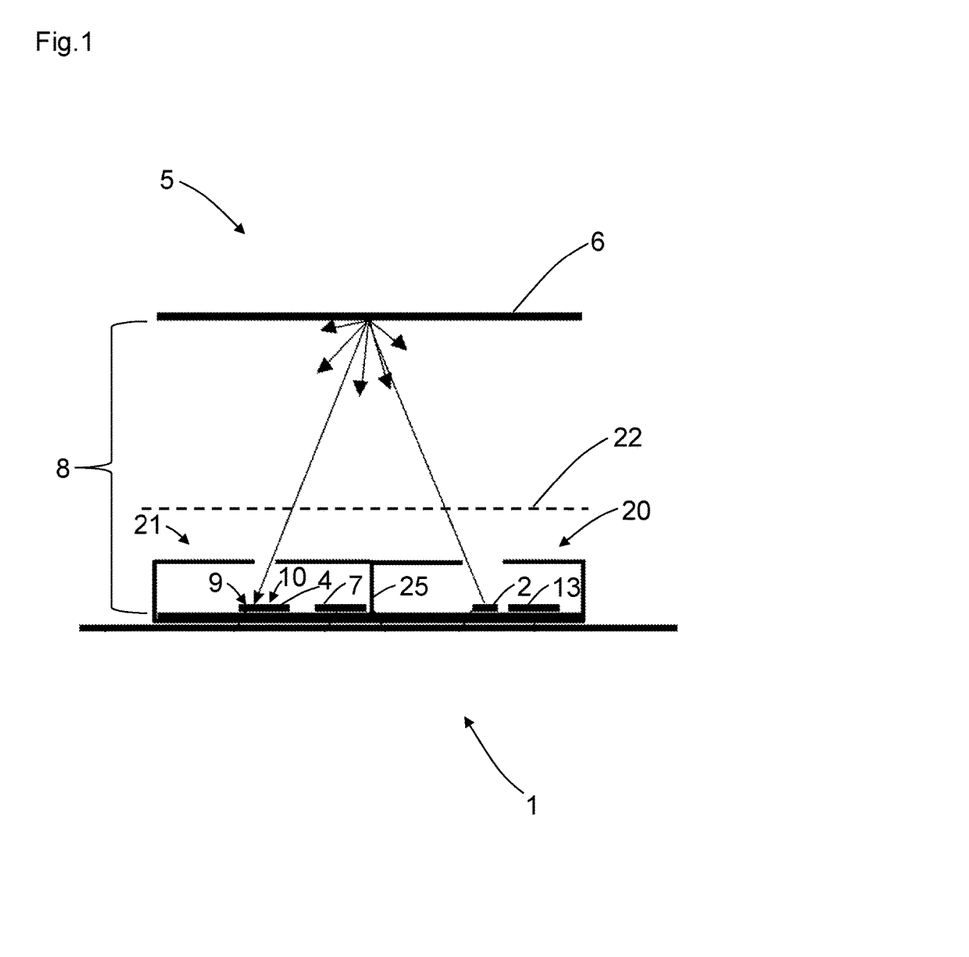
FIGS. 1 to 5 a light scanner of a light grid in accordance with the invention.

The light transmitter 2 is in this respect in accordance with FIG. 1 optionally arranged in a first housing chamber 20 and the light receiver 4 is arranged in a second adjacent housing chamber 21. The housing chambers 20, 21 are optically isolated by a channel separation 25 such that no direct optical connection is present between the light transmitter 2 and the light receiver 4. Only light of the light transmitter 2 reflected or remitted at an object 6 arrives at the light receiver 4.

Figure 6:
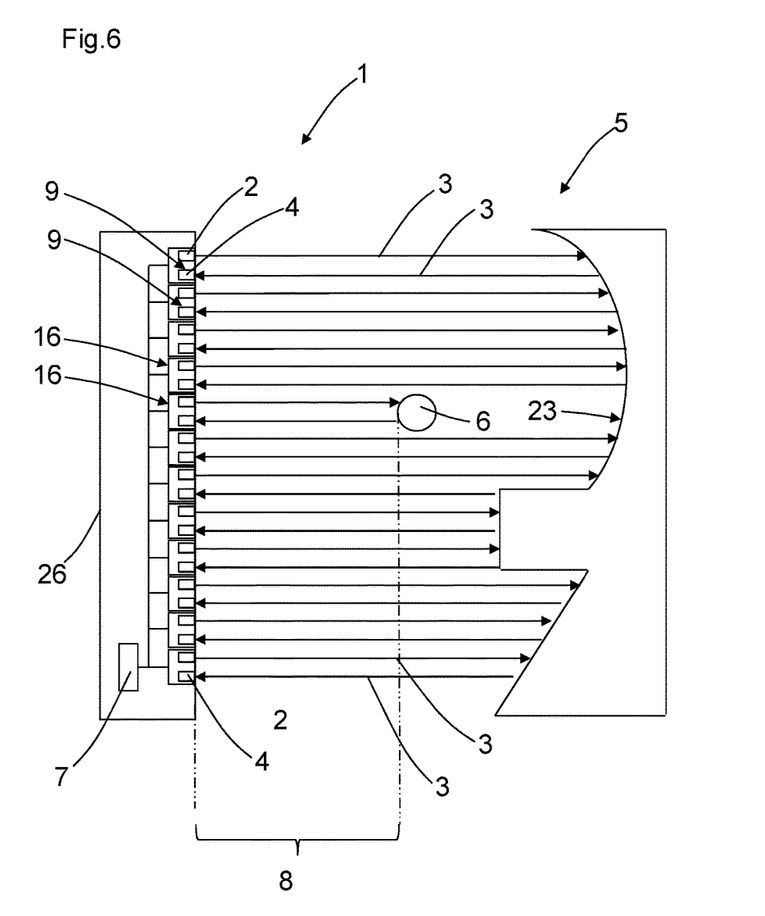
FIG. 6 a light grid with a reference surface.

In accordance with FIG. 6, a reference surface 23 is provided, wherein the light pulses 3 of the light transmitter 2 are incident on the reference surface 23 and the reflected light pulses 3 are incident on the light receiver 4.

The light grid 1 only has to be arranged and cabled at one side of the measured zone 5 or protected field. Each measurement channel or light scanner 16 comprising a light transmitter 2 and a light receiver 4 measures the distance 8 from a possible object 6 as well as, optionally, the signal amplitude scattered back from it via the time of flight.

The protected field dimensions or measured zone dimensions can be defined in two manners.

First, as shown in FIG. 6, the distances and signal amplitudes are taught with respect to an already present reference surface 23. In this process, the light grid 1 measures every deviation with respect to these taught values, namely distances which are too large or too small, or signal amplitudes which are too large or too small produce a protected field infringement and an object determination signal.

A safety-relevant testing of the light grid 1 is simpler since work is carried out with two different expected values with the measured value. Every deviation due to an incorrect measurement or to an environmental influence of the light grid 1, for example aging of the light transmitter 2, the influence of external light and/or contamination results in a different measured value on the monitoring of either the amplitude or the distance.

Second, as shown in FIG. 7, the distances for each measurement channel are configured using corresponding software. In this respect, the light grid 1 measures in a manner scanning freely in the space and every falling below of the configured distance value results in a protected field infringement. In this respect, variable protected field geometries which are shown dashed in FIG. 7, for example, can be implemented which can also be varied by protected field switchover, for example muting or blanking, e.g. in a cycle operation. The safety-relevant sensor testing is more difficult in this case since it is not possible to start from expected values.

Figure 10:
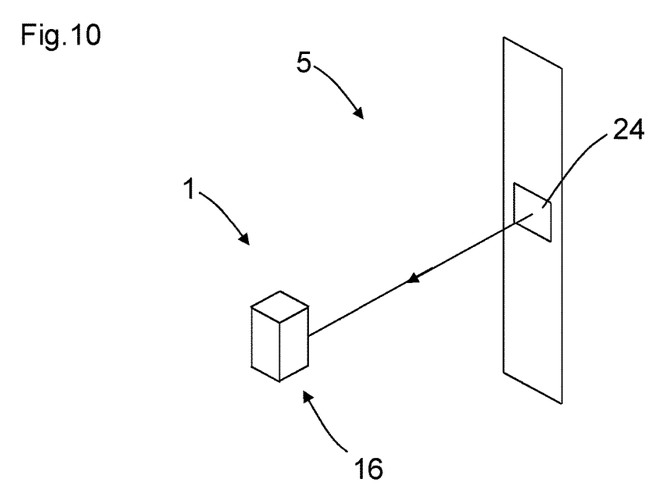
FIGS. 10 to 12 in each case a light grid with a retroreflector.
Figure 11:
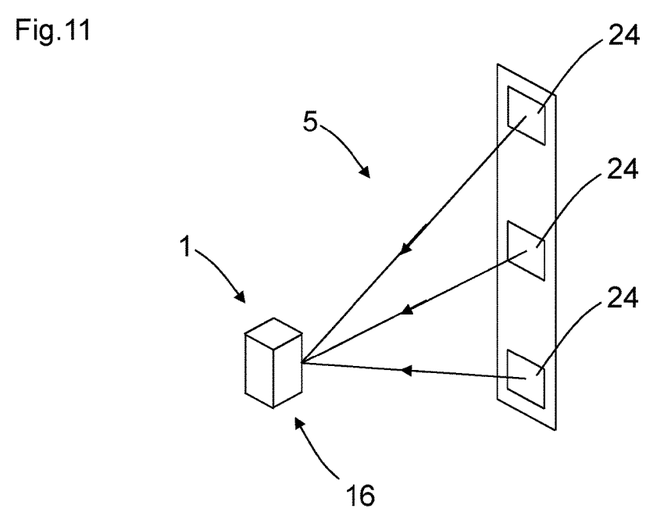

In accordance with FIG. 10 and FIG. 11 a retroreflector surface 24 is provided, wherein the light pulses 3 of the light transmitter 2 are incident on the retroreflector surface 24 and the reflected light pulses 3 are incident on the light receiver 4.

At least one light scanner 16, comprising a light receiver 4 and a light transmitter 2, are in this respect arranged at one side of the monitored zone or protected field of the measured zone 5. The retroreflector 24 is arranged at the oppositely disposed side. The retroreflector 24 is a triple reflector, for example. The retroreflector 24, for example, has a dimension of approximately 80 mm×80 mm. Other geometries and dimensions are also conceivable, however.

With suitable opening angles of the light transmitter 2 and of the light receiver 4 of the light scanner 16, the simultaneous monitoring of a plurality of retroreflectors 24 by one light scanner 16 is also possible in this respect.

Since the backscattered light signal of a retroreflector 24 is as a rule considerably higher than the light remitted by the other environment, light transmitters 2 and/or light receivers 4 can be operated without an additional collimation optics. The opening angles of the light transmitter 2 and light receiver 4 can in particular be restricted by additional optics for larger ranges and for improving the measuring behavior with external light.

The distance from the retroreflector 24 and the signal level measured at the light receiver 4 are taught during the putting into operation, for example.

It is possible by brief interruptions of the measurement cycle also to determine a level by external light irradiation by means of the light receiver 4. In this respect, fluctuations over larger time scales, for example due to temperature changes or due to changes of the environmental light, can be continuously logged and the desired values can be correspondingly compared in the measurement of the signal level.

Figure 12:
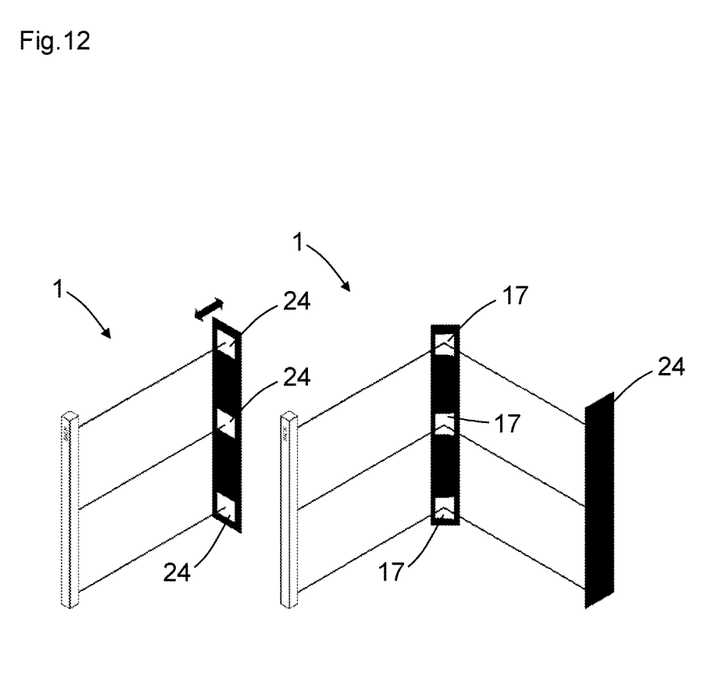

For example, a retroreflector 24 disposed opposite each light scanner 16 is associated with the light grid 1 in accordance with FIG. 12. The retroreflector 24 can in this respect also be arranged as movable, for example at a sliding gate. The detection of objects 6 is furthermore possible as long as the movement of the retroreflector 24 is substantially slower than typical object movements which are to be detected.

Furthermore, in accordance with FIG. 12, deflection mirrors 17 can also be arranged between the light scanner 16 or the light grid 1 and the retroreflector 24 to implement monitored zones over one or more corners.

Figure 8:
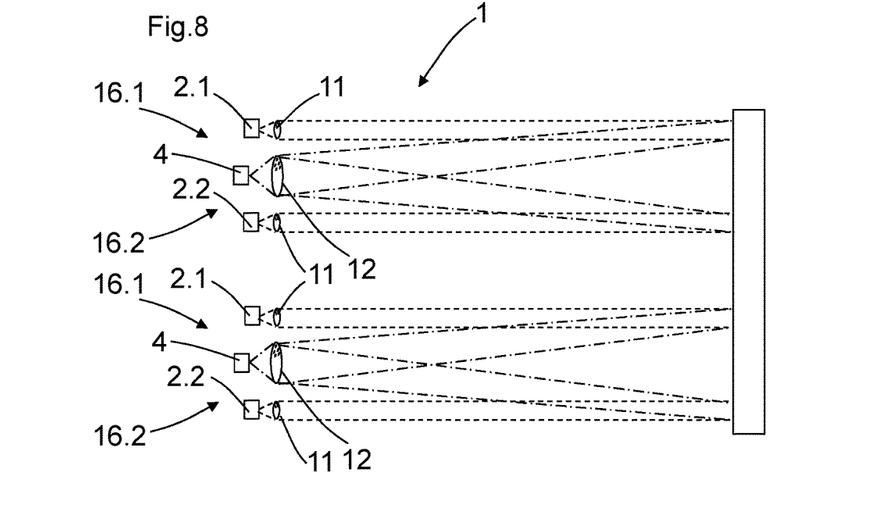

In accordance with FIG. 8, a first light receiver 4 forms a first light scanner 16.1 with a first light transmitter 2.1 and the first light receiver 4 forms a second light scanner 16.2 with a second light transmitter 2.2, wherein the first light transmitter 2.1 and the second light transmitter 2.2 can be activated one after the other. The reception lobe of the light receiver 4 in this respect covers both light transmitters 2.1 and 2.2.

With the scanning light grid 1 in accordance with the invention, the distance of the collimated light transmitters 2 is used for defining the geometrical resolution.

Figure 9:
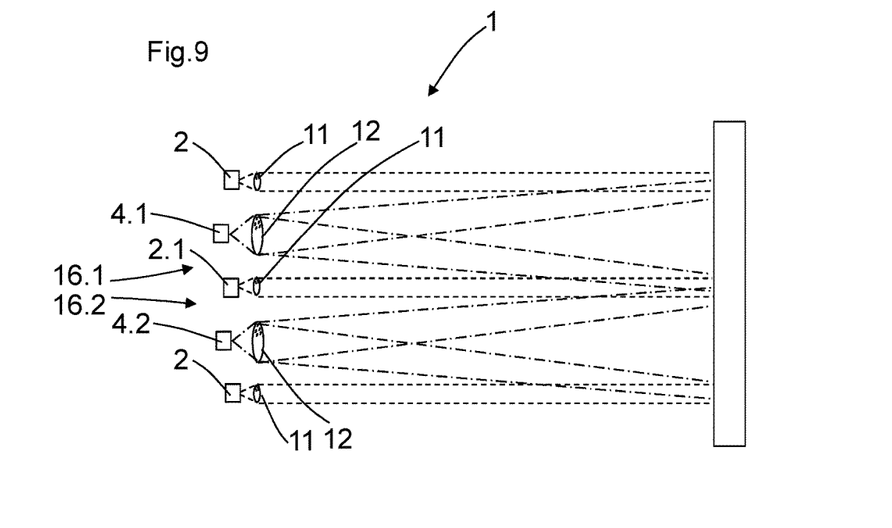

In accordance with FIG. 9, a first light receiver 4.1 forms a first light scanner 16.1 with a first light transmitter 2.1 and a second light transmitter 4.2 forms a second light scanner 16.2 with the first light transmitter 2.1.

In a further embodiment, a plurality of non-adjacent light transmitters 2 can be activated simultaneously.

To achieve a low response time, a plurality of light scanners 16 can be operated in parallel, preferably in an arrangement without overlapping of transmission lobes or reception lobes. For example, spaced apart light scanners 16 having a distance of e.g. 5 to 10 light scanners can be activated simultaneously. A directly adjacent light scanner 16 is activated thereafter in a time multiplex operation. Every distance measuring unit is therefore measured one after the other within spatial groups in a time multiplex. It is hereby achieved that the response time remains low as the length of a light grid 1 increases.

Optionally, different light transmitters 2 have different frequencies or different phases.

Phasing methods can also be used beyond the unambiguousness region by the monitoring of both the distance value and the signal level as long as an energetic detection of the retroreflector 24 is possible.

Figure 13:
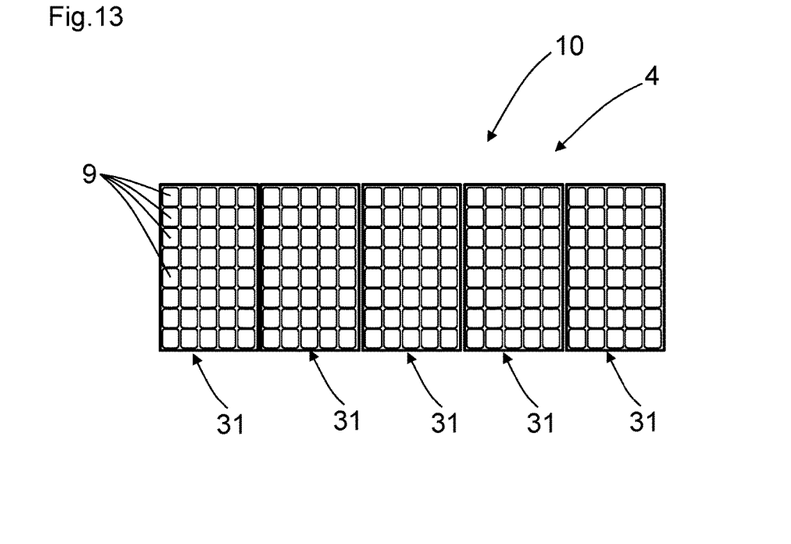
FIG. 13 a light receiver with a single photon avalanche diode array.

Optionally, the light receiver 4, as shown in FIG. 13, has at least one array 10 comprising single photon avalanche diodes 9.

To cover the option of a larger angular range by the light grid 1 and nevertheless to obtain the required spatial resolution for the detection of e.g. a leg, the single photon avalanche diode array 10 can be broken down into so-called macropixels 31. In this respect, a plurality of spatially adjacent single photon avalanche diode cells are associated with a common evaluation and evaluate the received light from a specific angular range via a corresponding optics. The arrangement can in this respect take place in a linear or areal manner.

The dynamics and/or an external light behavior can be scaled via the different single photon avalanche diodes 9 or single photon avalanche diode arrays 10.

The signal level can be determined with single photon avalanche diodes 10 either directly over the count rates of the photons if the signals are digitized directly on a pixel level or over the measurement of the amplitude of the sum current of all pixels. In the monitored state, both values are measured continuously and are compared with the taught desired value. If deviations occur in one of the two values, this deviation is checked for plausibility via the second measured value and is detected as an intrusion where applicable.

Figure 14:
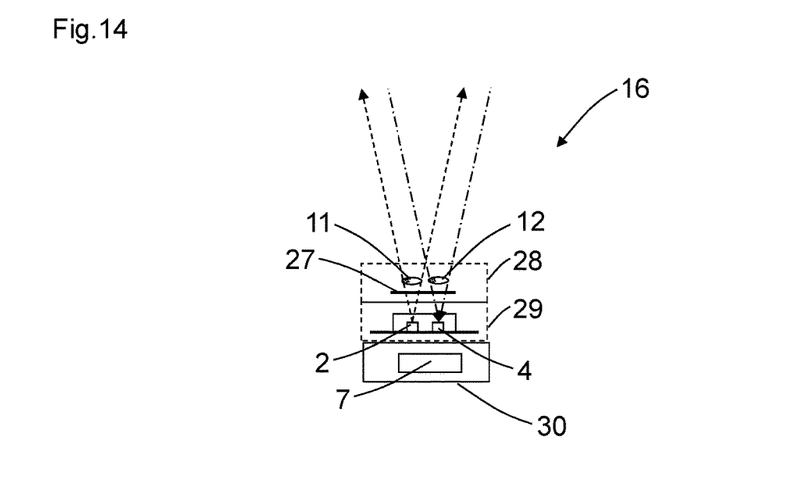
FIG. 14 a light scanner.

In an embodiment of the invention in accordance FIG. 14, a transmission optics 11, in particular a lens, is arranged in front of the light transmitter 2. The transmission optics 11 is optionally integrated on a chip or in the chip housing to achieve an inexpensive and compact solution, in particular with high volumes.

Different monitoring angles and different ranges can be realized by different transmission optics 11.

In a further embodiment in accordance with FIG. 14, a reception optics 12, in particular a lens, is arranged in front of the light receiver 4.

The reception optics 12 is optionally integrated on as chip or in the chip housing.

An optical band pass filter 27 can also be arranged, in particular vapor deposited, directly on the chip or on the light receiver to attenuate background light.

Different monitoring angles and different ranges can be realized by different reception optics 12.

In accordance with FIG. 1, a further light receiver is provided as a reference light receiver 13 as a second reception channel for a safety-relevant self-test.

The reference light receiver 13 is arranged in the same housing chamber 20 as the light transmitter 2 and is separated from the light receiver 4 by a channel separation 25. The reference light receiver 13 can in this respect be identical to the light receiver 4. The reference light receiver 13 can in particular be a single photon avalanche diode array 10.

The reference light receiver 13 allows the following self-tests.

Figure 2:
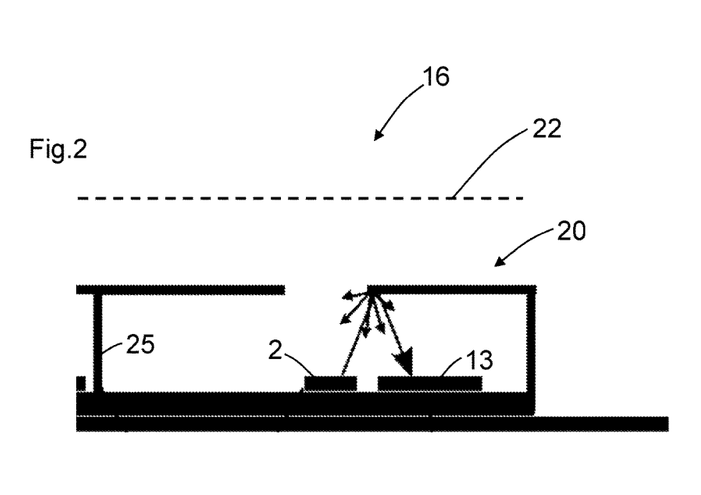

First, as shown in FIG. 2, the power, in particular the laser power, of the light transmitter 2 can be monitored in every measurement cycle via scattered light within the housing chamber 20 of the light scanner 16 in the reference light receiver 13. Large deviations or a failure of the light transmitter 2 can thus be recognized.

Second, the exact time behavior or timing of the light transmitter 2 can be monitored and offsets which may occur can be corrected, e.g. on temperature influences.

Figure 3:
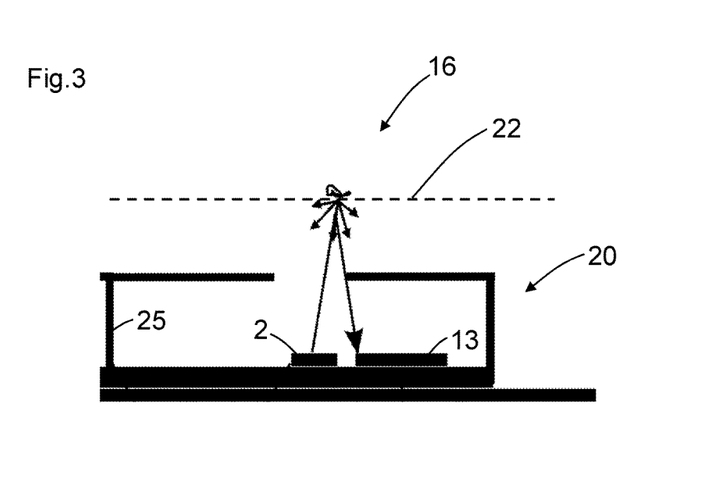

Third, as shown in FIG. 3, a contaminated front screen 22 of the light grid 1 can be detected via a change of the front screen echo due to backscatter at the dirt particles on the front screen 22.

Figure 4:
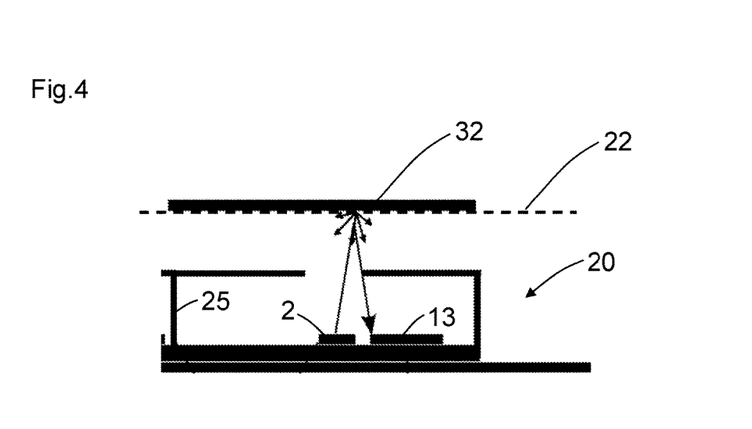

Fourth, as shown in FIG. 4, manipulation attempts by means of a manipulation 32, for example, can likewise be recognized via the backscatter to the reference light receiver 32, even if the light receiver 4 does not receive any signal.

Fifth, in the phases in which no light is transmitted, the external light level can be measured at the reference light receiver 13. The corresponding measured signal can be compared with the signal of the light receiver 4, whereby the sensitivity of the light receiver 4 can be verified and can be used with an optionally different scaling for checking the required signal-to-noise ratio in the actual measurement channel.

Additional measured values which are generated on the light receiver 4 and on the reference light receiver 13 allow a technical safety evaluation of the operational reliability.

A direct measurement of the external light level on the light receiver 4 and optionally on the reference light receiver 13 allows a good determination of the signal-to-noise ratio and allows a safety-relevant sensitivity of the system.

Figure 5:
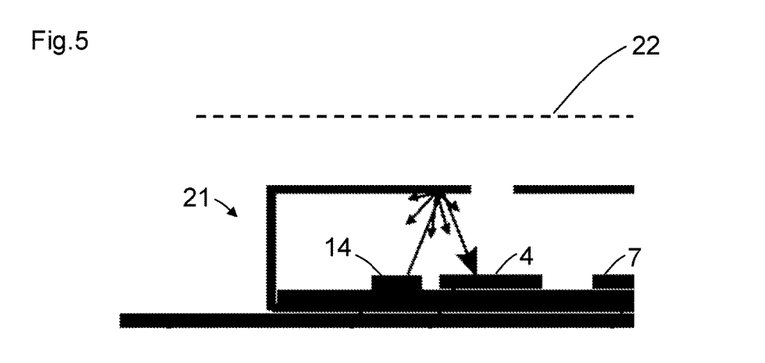

In accordance with FIG. 5, a further light transmitter is provided as a reference light transmitter 14 for the safety-relevant self-test.

The reference light transmitter 14 can be integrated in the housing chamber 21 of the light receiver 4 for testing the light receiver 4. A test of the reception channel to the time behavior or timing as well as effects dependent on the signal level can hereby be carried out. The reference light transmitter 14 is here preferably attached close to the light receiver 4 and can, for example, likewise be integrated in the CMOS.

Due to the spatial proximity, the additional reference light transmitter 14 can be realized with a lower power light transmitter 2 and thus less expensive light transmitter 2. The transmission power of the reference light transmitter 14 is set such that the signal level corresponds to the actual received signals of the light receiver 4. The same applies to the time progression of the transmitted signal of the reference light transmitter 14.

Optical test pulses having different time progressions and amplitudes can be used for testing the light receiver 4 and a time of flight can be imitated via a controllable delay relative to the start time of the measurement.

Overload measurements can in particular be easily carried out in this manner. The time behavior, that is the timing, of the distance measurement chain can be tested via a programmable variable delay before the light transmitter 2.

The dynamics of the light receiver 4 can be tested via an adjustable signal level of the light transmitter 2. The reference light transmitter 14 can be set up with a lower power transmission diode and thus less inexpensive transmission diode since, due to the spatial proximity, a smaller transmission power is sufficient to generate comparable signals on the light receiver. The reference light transmitter 14 can likewise be integrated in CMOS technology.

The reference light transmitter 14 thus allows the following tests:

First, a linearity and an integrity of the received signals of the light receiver 4 can be ensured for different delays or times of flight. The distance measurement can thus be checked indirectly.

Second, the dynamics and the sensitivity of the light receiver 4 can be checked by measuring the signal level using different reference amplitudes. The measurements can also be used for compensating aging effects or degradation or for compensating temperature effects.

Third, e.g. overload measurements can be carried out as required.

Optionally, the control and evaluation unit 7 is configured with two channels.

The light grid 1 can be used as an independent safety sensor or safety light grid due to the two-channel control and evaluation unit 7.

The light grid 1 is thereby itself able to carry out a plurality of self-tests and to ensure is own functionality in a comprehensive manner.

Furthermore, however, a plurality of light scanners 16 can communicate over a common bus and a central safety controller is used to configure the individual light scanners 16, to poll their states and, optionally, to feed in suitable test signals, to evaluate and compare the received signals, to signal warnings and, in case of danger, to stop a machine to be secured or to stop a self-driving vehicle to be secured.

Optionally, a positional sensor is provided for evaluating the sensor position of the light grid 1. A safety-relevant alignment of the light grid 1 is in particular provided. If the light grid is positioned by the user and if it monitors the desired zone, it may be necessary to monitor this position of the monitored zone in order e.g. to recognize a maladjustment of the light grid 1 due to mechanical effects.

Once the position has been taught once, the positional sensor recognizes every change and a safety controller connected downstream or a safety control connected downstream evaluates the position signals if a safety problem is produced by a maladjustment.

In addition, the positional sensor can serve as an alignment aid or as an electronic spirit level, which is in particular helpful on the adjustment of a sensor system or light grid 1.

The light scanner is optionally an integrated light scanner module.

A modular design in accordance with FIG. 14 serves as the basis for the light grid 1. The light grid 1, for example, has the components: An optics module 28 with transmission optics 11 and reception optics 12, a measuring core 29 with light transmitters 2 and light receivers 4 and/or a back end 30 with a control and evaluation unit 7, I/O drivers, a bus interface and/or a safety control.

The measuring core 29 preferably comprises a high-integration CMOS-ASIC. A design of discrete components is, however, likewise possible.

Due to the good alignment characteristics of light, different variants of the light grid 1 can be realized with different opening angles and ranges through corresponding optics modules 28 and are adapted to different demands of different applications.

in accordance with FIG. 1, light transmitters 2 and light receivers 4 can be operated without transmission optics and reception optics, whereby a greater opening angle and a small range is achieved. However, the light beams can also be collimated or further expanded by optical elements.

The light receiver 4 can be provided with a filter element, for example with a band pass filter 27, for restricting the external light incidence, as shown in FIG. 14.

REFERENCE NUMERALS 1 light grid
2 light transmitter
3 light pulses
4 light receiver
5 measured zone
6 object
7 control and evaluation unit
8 distance
9 single photon avalanche diodes
10 array
11 transmission optics
12 reception optics
13 reference light receiver
14 reference light transmitter
15 housing
16 light scanner
17 deflection mirror
20 first housing chamber
21 second housing chamber
22 front screen
23 reference surface
24 retroreflector
25 channel separation
26 housing
27 band pass filter
28 optics module
29 measuring core
30 back end 31 macropixel
32 manipulation object

The invention claimed is:

1. A light grid in accordance with the time of flight principle, comprising:
a plurality of light scanners arranged in a housing with each light scanner comprising at least one light transmitter and at least one light receiver, the plurality of light scanners being arrayed and linearly aligned, wherein the at least one light transmitter is positioned within a first housing chamber and the at least one light receiver is positioned within a second housing chamber, the first and second housing chambers being optically isolated from one another such that the at least one light receiver does not receive unreflected portions of light signals transmitted by the at least one light transmitter; and
a further light receiver as a reference light receiver as a second reception channel for a safety-relevant self-test, wherein the reference light receiver is positioned within the first housing chamber,
wherein the at least one light transmitter is configured to transmit the light signals into a measured zone,
wherein the at least one light receiver is configured to receive the light signals reflected from the measured zone, and is further configured to supply the light signals in the form of received electrical signals to a control and evaluation unit,
wherein the control and evaluation unit is configured to determine a distance signal representative of a distance of objects from the light grid from a time between transmission and reception of the light signals while taking account of the speed of light, and
wherein the light receiver has at least one single photon avalanche diode.

2. The light grid in accordance with claim 1, further comprising a reference surface, with the light signals of the light transmitter being incident on the reference surface and the reflected light signals being incident on the light receiver.

3. The light grid in accordance with claim 1, further comprising a retroreflector surface, with the light signals of the light transmitter being incident on the retroreflector surface and the reflected light signals being incident on the light receiver.

4. The light grid in accordance with claim 1, wherein the at least one light receiver comprises a first light receiver and the at least one light transmitter comprises first and second light transmitters, the first light receiver and the first light transmitter forming a first light scanner, and the first light receiver and the second light transmitter forming a second light scanner, with the first light transmitter and the second light transmitter being activated one after the other.

5. The light grid in accordance with claim 1, wherein the at least one light receiver comprises first and second light receivers, and the at least one light transmitter comprises a first light transmitter, the first light receiver and the first light transmitter forming a first light scanner, and the second light receiver and the first light transmitter forming a second light scanner.

6. The light grid in accordance with claim 1, wherein a plurality of non-adjacent light transmitters can be activated simultaneously.

7. The light grid in accordance with claim 1, wherein different light transmitters have different pulse repetition frequencies, modulation frequencies or different phases.

8. The light grid in accordance with claim 1, wherein the light receiver has at least one array comprising single photon avalanche diodes.

9. The light grid in accordance with claim 1, further comprising transmission optics arranged in front of the light transmitter.

10. The light grid in accordance with claim 9, wherein the transmission optics is a lens.

11. The light grid in accordance with claim 1, further comprising reception optics arranged in front of the light receiver.

12. The light grid in accordance with claim 11, wherein the reception optics is a lens.

13. The light grid in accordance with claim 1, further comprising a further light transmitter as a reference light transmitter for a safety-relevant self-test.

14. The light grid in accordance with claim 1, wherein the control and evaluation unit is configured with two channels.

15. The light grid in accordance with claim 1, further comprising a positional sensor for evaluating the sensor position of the light grid.

16. The light grid in accordance with claim 13, wherein the reference light transmitter is positioned within the second housing chamber.

* * * * *